No. 853,374. PATENTED MAY 14, 1907.
K. C. RANDALL.
SYSTEM OF DISTRIBUTION.
APPLICATION FILED MAY 2, 1906.
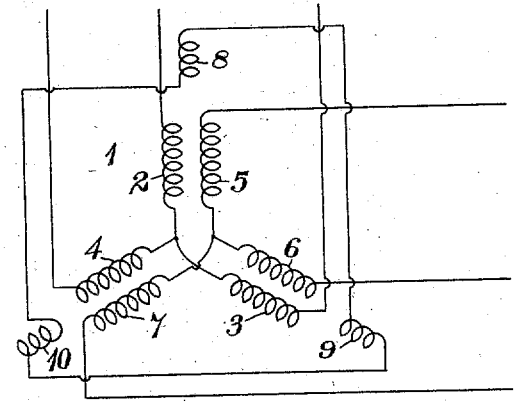
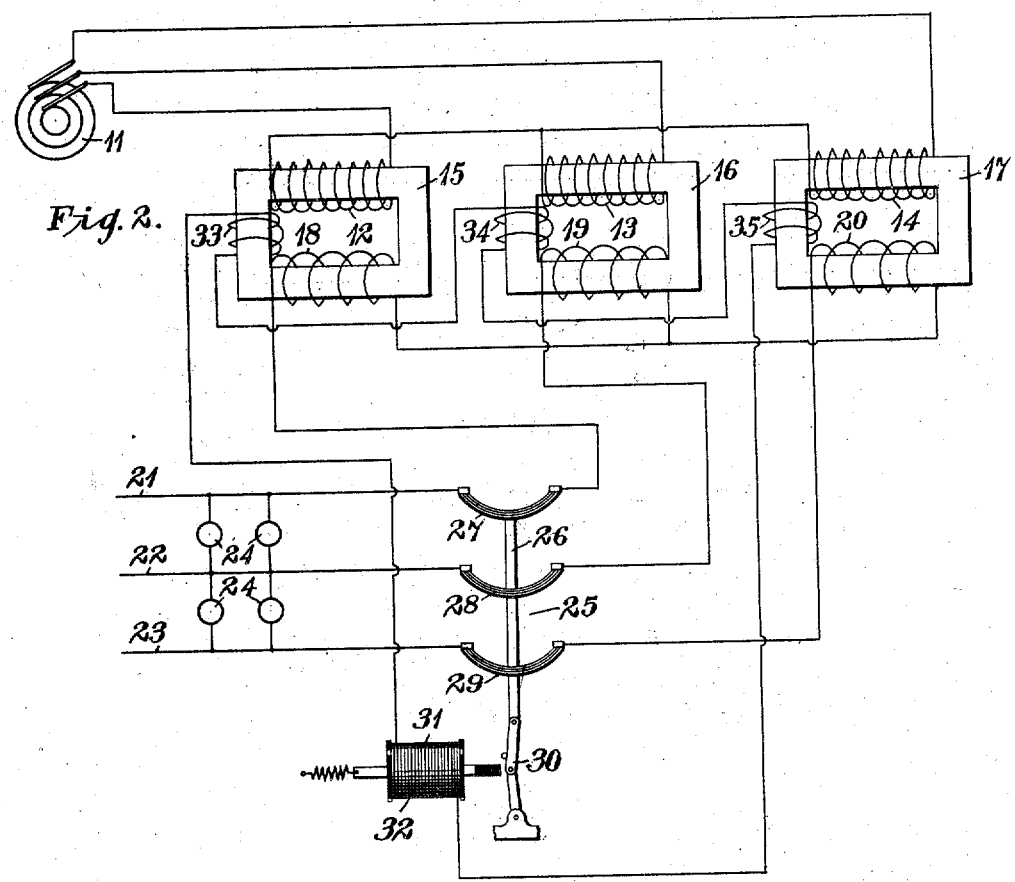
WITNESSES:
Fred H Miller
R P Dearborn
INVENTOR
Karl C. Randall
BY
Wesley G Lean
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

No. 853,374.　　　　Specification of Letters Patent.　　　　Patented May 14, 1907.

Application filed May 2, 1906. Serial No. 314,872.

*To all whom it may concern:*

Be it known that I, KARL C. RANDALL, a citizen of the United States, and a resident of Edgewood Park, in the county of Allegheny and State of Pennsylvania, have invented a new and useful Improvement in Systems of Distribution, of which the following is a specification.

My invention relates to systems of electrical distribution and has especial reference to three-phase alternating current transforming and distributing systems.

The object of my invention is to provide means for balancing the voltage between secondary circuits in transformers the primaries and secondaries of which are severally star-connected.

When three-phase transformers or three single-phase transformers have been employed for changing the voltage between a supply line and a distributing system, it has been usual to connect both the primary and secondary windings by a delta-connection or at least to connect either the primary or the secondary coils in this manner, in order to equalize the voltage between circuits under varying conditions of load. It is sometimes desirable, however, to connect both the primary and secondary coils by star-connection, and in order that the voltage between the circuits may be equalized, in such cases I provide an auxiliary coil for each phase of the transformer, or for each transformer, if three single-phase transformers are employed, and delta-connect these coils. With a winding of this character, variations in the voltage between circuits, which are due to differences in the load upon several circuits or to abnormal disturbances in the circuits, such as a ground, will be corrected and the currents carried by the auxiliary winding will usually be relatively small so that this winding may be applied at small expense.

Figures 1 and 2 of the accompanying drawings are diagrammatic views of distributing systems arranged in accordance with my invention.

Referring to Fig. 1 of the drawings, a three-phase transformer 1 is provided with star-connected primary coils 2, 3 and 4, star-connected secondary coils 5, 6 and 7, and delta-connected auxiliary coils 8, 9 and 10. The coils 2, 5 and 8; 4, 7 and 9, and 3, 6 and 10 are, respectively, included in the same magnetic circuit so that three-phase electrical energy may be supplied to the primary coils and energy taken from the secondary coils for any desired purpose, while the auxiliary coils 8, 9 and 10 carry a relatively small current which tends to balance the electromotive forces between the secondary circuits. It is conceivable that the current carried by the auxiliary windings may become excessive when serious disturbances occur on the line supplied by the transformer and this effect may be used for interrupting either the primary or secondary circuits, by providing a circuit-breaker or interrupter which is normally closed but which may be released by an electrically-operated release magnet included in circuit with the auxiliary coils.

Referring to Fig. 2, electrical energy is supplied from a three-phase source 11 to star-connected primary coils 12, 13 and 14 of a plurality of similar single-phase transformers 15, 16 and 17. The transformers are provided with secondary coils 18, 19 and 20 which are also star connected. Energy is supplied from the secondary windings of the transformers 15, 16 and 17 to line conductors 21, 22 and 23, from which energy may be supplied to translating devices 24. A circuit interrupter 25 that is adapted to interrupt the circuits 21, 22 and 23, comprises a connecting rod 26 and bridging contact members 27, 28 and 29, and may be held in its closed position, in opposition to the force of gravity, by a toggle joint 30. A tripping magnet 31 is also provided with an operating coil 32 which breaks the toggle joint 30 and opens the circuit breaker 25 when the current flowing through the coil exceeds a predetermined amount. The transformers 15, 16 and 17 are further provided with delta-connected auxiliary coils 33, 34 and 35, and the magnet winding 32 is connected in the circuit with, and receives energy from, these windings.

If the electrical performances of the transformers should be slightly different or if the load taken from one phase of the outgoing circuit should be greater than that taken from another phase, the electromotive forces between conductors 21, 22 and 23 would become unbalanced, except for the action of the auxiliary coils 33, 34 and 35 which tend to correct this difficulty and to equalize the electromotive forces between lines.

If an abnormal disturbance occurs in one phase of the secondary circuit, an excessive current will traverse the circuits of the auxiliary coils which will attempt to correct the trouble, and if this correcting current exceeds a predetermined amount, the tripping magnet 31 will be actuated and the secondary circuits, which are established through the bridging contact members 27, 28 and 29, will be interrupted.

Although I have shown a specific arrangement, I desire that only such limitations be imposed as are indicated in the appended claims, and it will be understood that the circuit interrupter may be arranged to open either the secondary circuits 21, 22 and 23 or the primary circuits which are connected to the source of supply.

I claim as my invention:

1. A transformer having star-connected primary coils, star-connected secondary coils, and a group of delta-connected auxiliary coils.

2. In a transformer, the combination with star-connected primary coils and star-connected secondary coils, of delta-connected coils that are magnetically interlinked therewith.

3. In a system of alternating current distribution, the combination with star-connected transformer primary coils and star-connected transformer secondary coils, of means for maintaining a substantially balanced voltage between the outgoing circuits.

4. In a system of alternating current distribution, the combination with star-connected transformer primary coils, and star-connected transformer secondary coils, of means for maintaining a substantially balanced voltage between the outgoing circuits that comprises auxiliary delta-connected coils.

5. The combination with a three-phase source of alternating current electrical energy, star-connected transformer primary coils supplied therefrom and secondary star-connected coils magnetically interlinked with the primary coils, of delta-connected auxiliary coils which are respectively linked by the same magnetic circuits as the primary and secondary coils.

6. The combination with a three-phase source of alternating current electrical energy, star-connected transformer primary coils supplied therefrom, secondary star-connected coils magnetically interlinked with the primary coils and a circuit interrupter for the secondary circuits, of delta-connected auxiliary coils which are respectively linked by the magnetic circuits of the primary and secondary coils, and a tripping coil for said circuit interrupter which is connected in circuit therewith.

7. The combination with a three-phase source of alternating current electrical energy, star-connected primary transformer coils supplied therefrom, star-connected secondary transformer coils, translating devices that are supplied from the secondary circuits, and a circuit interrupter for said circuits, of a tripping coil for said interrupter, delta-connected auxiliary coils which are connected in series with the tripping coil and are respectively included in the several magnetic circuits of the primary and secondary coils.

8. In a transformer, the combination with three groups of three-phase coils, two of which are star-connected and one of which is delta-connected.

9. The combination with two groups of star-connected transformer coils and a circuit interrupter for one group, of a tripping coil for said interrupter, and delta-connected auxiliary coils which are connected in series with the tripping coil and are respectively included in the several magnetic circuits of the star-connected coils.

10. The combination with a three-phase source of alternating current electrical energy, star-connected groups of primary and secondary coils, and a circuit interrupter for one of said groups, of delta-connected auxiliary coils which are respectively linked by the magnetic circuits of the primary and secondary coils, and a tripping coil for said circuit interrupter which is connected in circuit with the auxiliary coils.

In testimony whereof, I have hereunto subscribed my name this 30th day of April, 1906.

KARL C. RANDALL.

Witnesses:
J. S. WILLIAMS,
BIRNEY HINES.